(12) United States Patent
Long

(10) Patent No.: US 8,549,949 B2
(45) Date of Patent: Oct. 8, 2013

(54) BACKLASH ADJUSTMENT MECHANISM AND INDUSTRIAL ROBOT USING THE SAME

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 561 days.

(21) Appl. No.: 12/782,825

(22) Filed: May 19, 2010

(65) Prior Publication Data
US 2011/0107867 A1 May 12, 2011

(30) Foreign Application Priority Data
Nov. 6, 2009 (CN) .......................... 2009 1 0309394

(51) Int. Cl.
*F16H 55/18* (2006.01)
*F16H 55/20* (2006.01)

(52) U.S. Cl.
USPC ........................................ 74/490.01; 74/440

(58) Field of Classification Search
USPC ................ 74/490.01, 490.05, 409, 440, 321; 901/25, 26
See application file for complete search history.

(56) References Cited

U.S. PATENT DOCUMENTS

| 4,524,643 | A * | 6/1985 | Ziegler et al. ................. 475/345 |
| 4,671,732 | A * | 6/1987 | Gorman ........................ 414/735 |
| 4,787,262 | A * | 11/1988 | Kozawa et al. ............ 74/490.06 |
| 6,832,661 | B2 * | 12/2004 | Palfenier et al. .............. 180/444 |
| 7,673,534 | B2 * | 3/2010 | Prampolini .................. 74/15.86 |
| 2011/0120245 | A1 * | 5/2011 | Long ............................. 74/409 |
| 2011/0290060 | A1 * | 12/2011 | Long .......................... 74/490.01 |

FOREIGN PATENT DOCUMENTS

| CN | 201042895 Y | 4/2008 |
| CN | 101285520 | 10/2008 |
| EP | 0805738 B1 | 12/1998 |

* cited by examiner

*Primary Examiner* — Troy Chambers
*Assistant Examiner* — Terence Boes
(74) *Attorney, Agent, or Firm* — Altis & Wispro Law Group, Inc.

(57) ABSTRACT

A backlash adjustment mechanism includes a first cylindrical gear fixed in an axial position, a second cylindrical gear moveable along the axis and meshed with the first cylindrical gear, and an elastic member biasing the second cylindrical gear towards the first cylindrical gear. The addendum modification coefficients in the first and second cylindrical gears are linearly changed along their axes, respectively, an end of the first cylindrical gear with higher addendum modification coefficient meshes with an end of the second cylindrical gear with correspondingly lower addendum modification coefficient, and an end of the first cylindrical gear with lower addendum modification coefficient meshes with an end of the second cylindrical gear with correspondingly higher addendum modification coefficient.

12 Claims, 3 Drawing Sheets

BACKLASH ADJUSTMENT MECHANISM AND INDUSTRIAL ROBOT USING THE SAME

CROSS-REFERENCE TO RELATED APPLICATION

This application is related to a co-pending U.S. patent application, Ser. No. 12/632,955, filed on Dec. 8, 2009, and entitled "ROBOT ARM ASSEMBLY AND INDUSTRIAL ROBOT USING THE SAME". The inventor of the co-pending application is Bo Long. The co-pending application has the same assignee as the present application. The Specification and Drawings of the co-pending application are incorporated herein by reference.

BACKGROUND

1. Technical Field

The present disclosure generally relates to robotic technologies, and particularly, to a backlash adjustment mechanism and an industrial robot utilizing the backlash adjustment mechanism.

2. Description of Related Art

A commonly used industrial robot includes a plurality of arms connected in series. An actuator, such as a welding device, a gripper or a cutting tool, is mounted at a distal arm of the industrial robot to execute specific tasks. Generally six axes are utilized to achieve maximum movement of the actuator. Each arm of the industrial robot rotates around a rotation axis driven by a driving unit. Typically, the driving unit includes a motor mounted on one arm and a gear transmission mechanism coupled to the motor to transmit the movement of the motor to another arm.

The working range and capacity for movement of an industrial robot depend on, among other things, the gear transmission mechanism included. An additional factor influenced by the gear transmission mechanism is the performance of the industrial robot with respect to precision and/or accuracy. As backlash between meshed gears in the gear transmission mechanism is increased, the life and precision of the gear transmission mechanism are deteriorated by aggravated abrasion and oscillation caused by the deteriorated meshing condition. A commonly used method to decrease backlash is the employment of precision manufacturing and assembly, thus increasing cost.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 2:
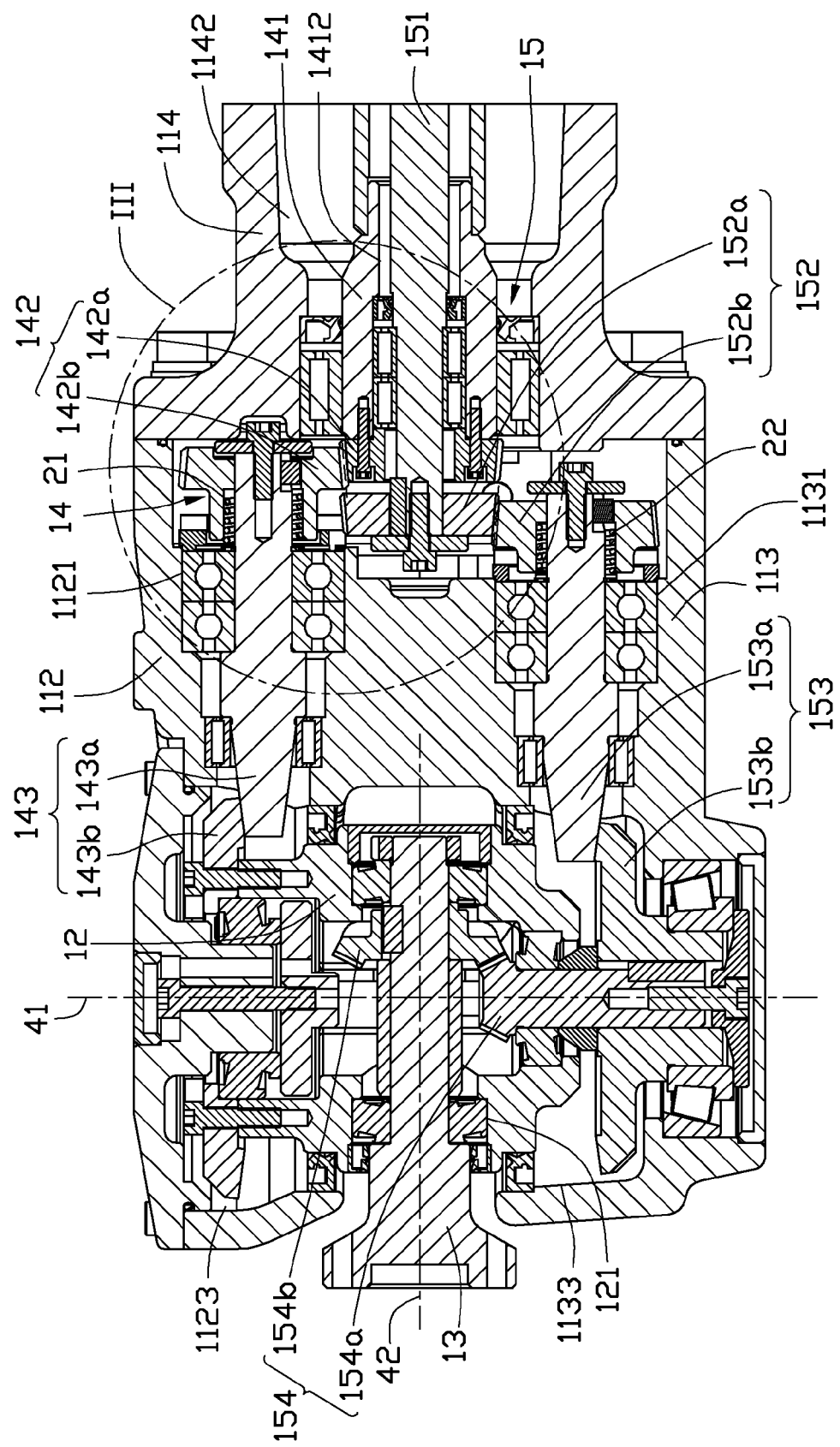
FIG. 2 is a cross section of the joint of FIG. 1, taken along the line II-II.

One embodiment of an industrial robot according to the present disclosure may be a six-axis robot. The industrial robot includes a fixed base, a bracket rotatably connected to the fixed base, a lower arm rotatably connected to the bracket, an elbow rotatably connected to the lower arm, and a joint 100, as illustrated in FIG. 2, connected to the elbow. The fixed base, bracket, lower arm, and elbow are similar to those of a traditional six-axis industrial robot and are not shown in drawings here. The bracket, lower arm, and elbow are capable of rotating about a first, a second and a third rotation axes, respectively.

Figure 1:
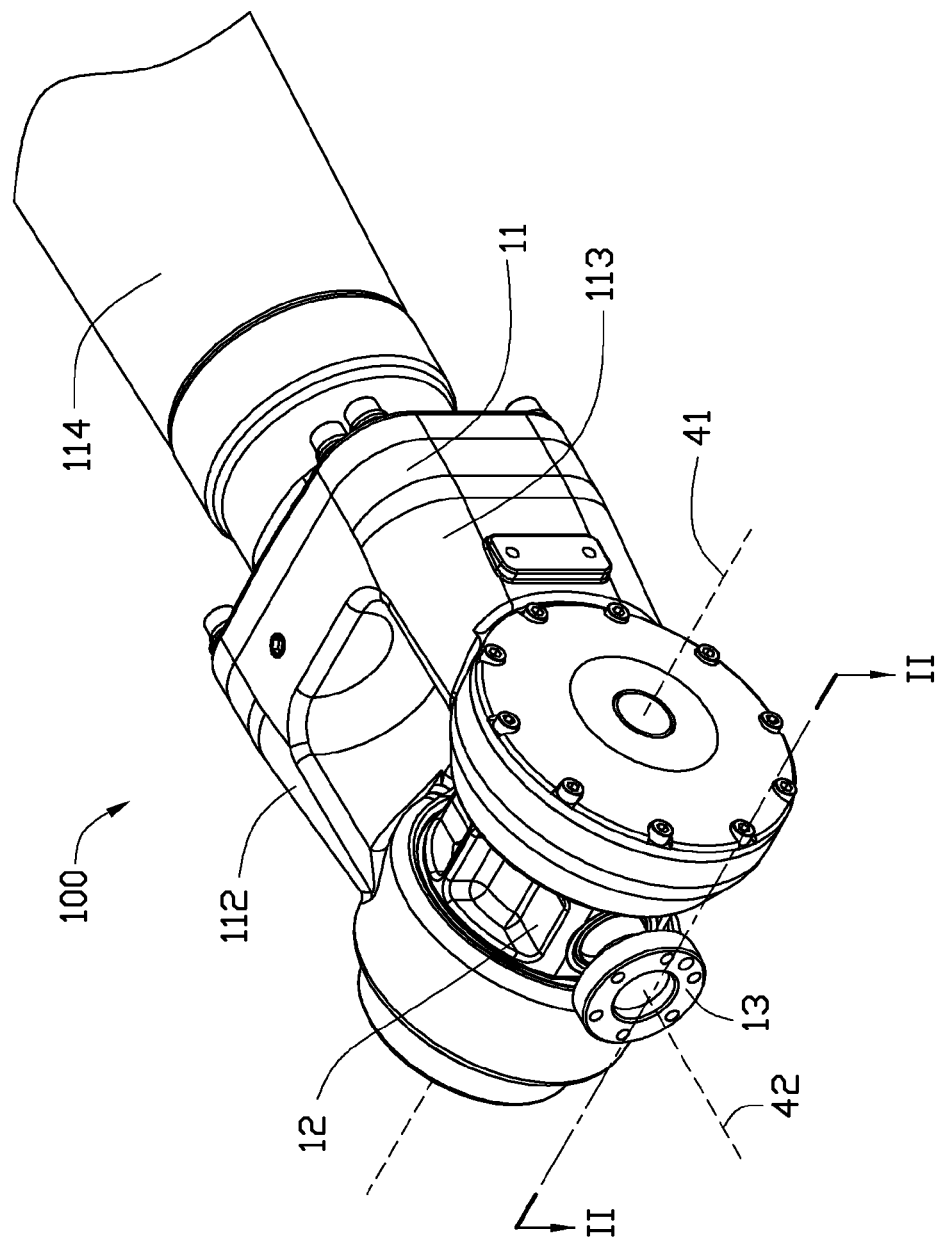
FIG. 1 is an isometric view of a joint of one embodiment of an industrial robot.

Referring to FIGS. 1 and 2, the joint 100 includes a fourth arm 11 rotatably connected to the elbow, a fifth arm 12 rotatably connected to the fourth arm 11 about a fifth rotation axis 41, and a sixth arm 13 rotatably connected to the fifth arm 12 about a sixth rotation axis 42.

The industrial robot further includes a first motor (not shown) and a first transmission mechanism 14 to drive the fifth arm 12, a second motor (not shown) and a second transmission mechanism 15 to drive the sixth arm 13. The fifth rotation axis 41 is substantially perpendicular to the sixth rotation axis 42. An actuator (not shown), such as a welding device, a gripper or a cutting tool, is mounted at a distal end of the sixth arm 13 of the industrial robot to execute specific tasks.

The fourth arm 11 is substantially an outer fork with a first fork branch 112, a second fork branch 113, and a connection portion 114 connecting the first and second fork branches 112, 113. The connection portion 114 defines a hollow portion 1142 therein along the rotation axis of the fourth arm 11. The first fork branch 112 defines a first assembly hole 1121 and the second fork branch 113 defines a second assembly hole 1131. The hollow portion 1142, the first and second assembly holes 112, 113 are substantially parallel and extend perpendicular to the fifth rotation axis 41. The first and second fork branches 112, 113 further define two third assembly holes 1123, 1133, respectively.

The fifth arm 12 is substantially cylindrical and is positioned between the first and second fork branches 112, 113, with two ends rotatably received in the third assembly holes 1123, 1133, respectively. The fifth arm 12 defines a through hole 121 extending substantially along the sixth rotation axis 42. The sixth arm 13 is rotatably received in the through hole 121 about the sixth rotation axis 42, and capable of rotating together with the fifth arm 12.

The first transmission mechanism 14 transmits the movement of the first motor to the fifth arm 12 to rotate the fifth arm 12. The first transmission mechanism 14 includes a first shaft 141, a first cylindrical gear assembly 142, and a first beveled gear assembly 143. The first motor and the first cylindrical gear assembly 142 are mounted on opposite ends of the first shaft 141.

The first cylindrical gear assembly 142 includes a first cylindrical gear 142a and a second cylindrical gear 142b meshed with the first cylindrical gear 142a. The first beveled gear assembly 143 includes a first beveled gear 143a and a second beveled gear 143b meshed with the first beveled gear 143a. The first cylindrical gear 142a is fixed to the first shaft 141, and the second cylindrical gear 142b is connected to the first beveled gear 143a and movable along an axis of the second cylindrical gear 142b. The second beveled gear 143b is fixed to the fifth arm 12 to rotate the fifth arm 12 about the fifth rotation axis 41. The first shaft 141 defines a second through hole 1412 along the axis thereof.

The second transmission mechanism 15 transmits the movement of the second motor to the sixth arm 13 to rotate the sixth arm 13 about the sixth rotation axis 42. The second transmission mechanism 15 includes a second shaft 151, a second cylindrical gear assembly 152, a second beveled gear assembly 153 and a third beveled gear assembly 154.

The second shaft 151 is received in the second through hole 1412 with the two ends of the second shaft 151 extending out of the through hole 1412. The second motor and the second cylindrical gear assembly 152 are mounted on opposite ends of the second shaft 151. The first and second motors are mounted on opposite sides of the fourth arm 11. The second cylindrical gear assembly 152 includes a first cylindrical gear 152a and a second cylindrical gear 152b meshed with the first cylindrical gear 152a. The first cylindrical gears 142a, 152a are offset along the axis thereof. The second beveled gear assembly 153 includes a pair of meshed beveled gears 153a and 153b. The third beveled gear assembly 154 includes a pair of meshed beveled gears 154a and 154b. The first cylindrical gear 152a is fixed to the second shaft 151. The second cylindrical gear 152b is connected to the beveled gear 153a via a key (not labeled) and movable along the axis of the second cylindrical gear 152b. The beveled gear 153b of the second beveled gear assembly 153 is fixed to the beveled gear 154a of the third beveled gear assembly 154. The beveled gear 154b is fixed to the sixth arm 13 to rotate the sixth arm 13 about the sixth rotation axis 42.

Figure 3:
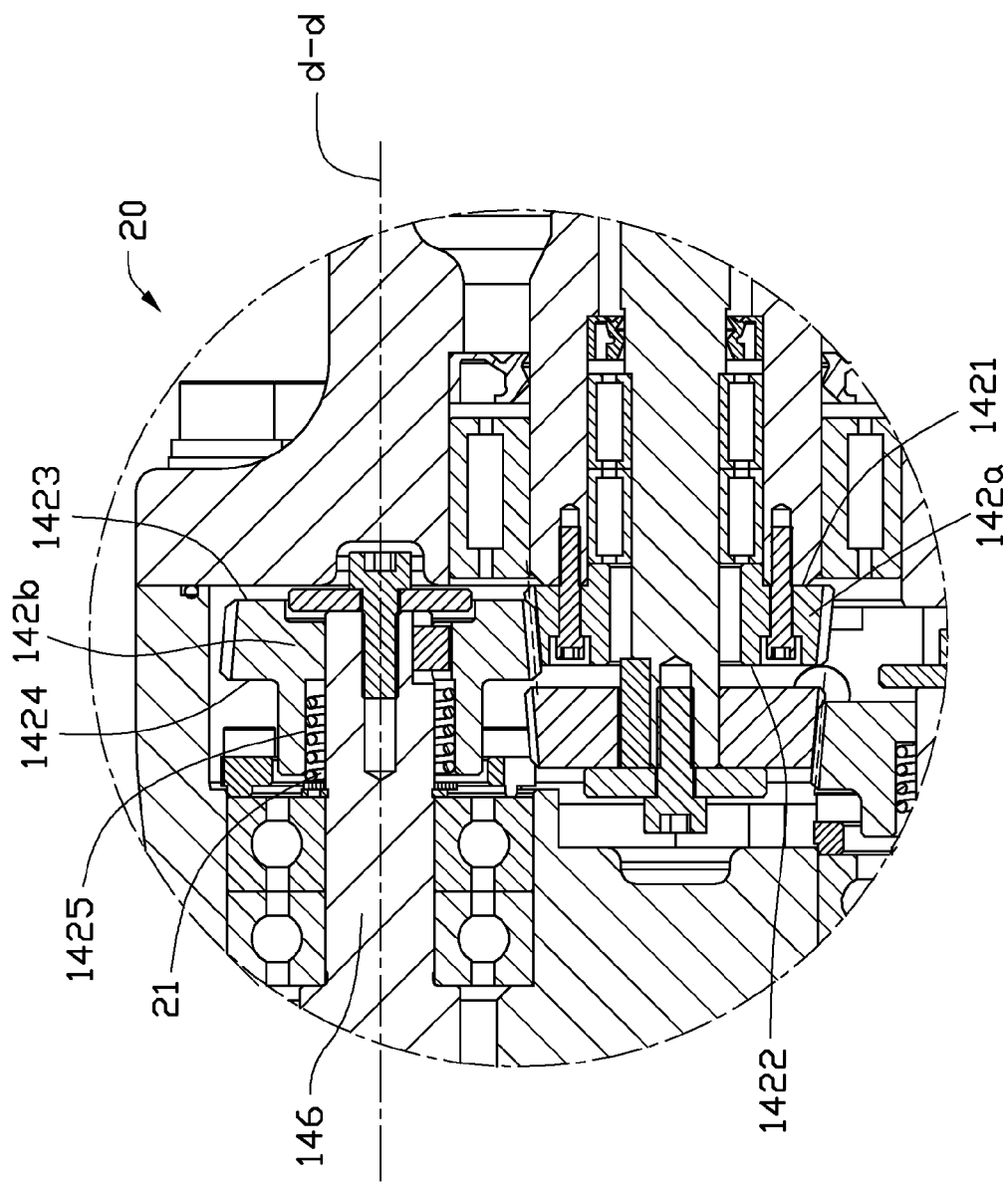
FIG. 3 is a detailed enlarged view of a circled portion III of FIG. 2, showing one embodiment of a backlash adjustment mechanism utilized in the industrial robot of FIG. 1.

Referring to FIG. 3, one embodiment of a backlash adjustment mechanism 20 utilized in the industrial robot as disclosed is shown. Backlash adjustment mechanism 20 adjusts the backlash of the first and second cylindrical gear assemblies 142, 152. In the following, the backlash adjustment mechanism 20 for adjusting backlash of the first cylindrical gear assembly 142 is used as an example.

The backlash adjustment mechanism 20 to adjust backlash in the first cylindrical gear assembly 142 includes the first cylindrical gear 142a, the second cylindrical gear 142b, and an elastic member 21 to bias the second cylindrical gear 142b towards the first cylindrical gear 142a and eliminate backlash therebetween. In the illustrated embodiment, the first and second cylindrical gears 142a, 142b are meshed straight involute gears.

The first cylindrical gear 142a includes a first end 1421 and a second end 1422. The addendum modification coefficient in the first cylindrical gear 142a is linearly increased along the axis from the first end 1421 to the second end 1422. That is, the outer surface of the first cylindrical gear 142a is substantially conical with the first end 1421 having a larger diameter than the second end 1422. The tooth thickness of the first cylindrical gear 142a is linearly changed corresponding to the addendum modification coefficient.

The second cylindrical gear 142b includes a first end 1423 and a second end 1424. The addendum modification coefficient in the second cylindrical gear 142b is linearly decreased along the axis from the first end 1423 to the second end 1424. That is, the outer surface of the first cylindrical gear 142b is substantially conical with the first end 1423 having a smaller diameter than the second end 1424. The tooth thickness of first cylindrical gear 142a is linearly changed corresponding to the addendum modification coefficient. The first end 1423 of the second cylindrical gear 142b meshes with the first end 1421 of the first cylindrical gear 142a, and the second end 1424 of the second cylindrical gear 142b meshes with the second end 1422 of the first cylindrical gear 142a. The conical degrees of the first and second cylindrical gears 142a, 142b are about 5°, for optimum meshing.

In the illustrated embodiment, the first cylindrical gear 142a is fixed on the position along the axis direction thereof. The second cylindrical gear 142b is connected to a gear shaft 146 of the first beveled gear 143a via a key (not labeled) and movable along the axis direction of the gear shaft 146. The second end 1424 of the second cylindrical gear 142b defines a receiving hole 1425 to receive the elastic member 21. The elastic member 21 may be a helical-coil compression spring sleeved on the gear shaft 146. The elastic member 21 is received in the receiving hole 1425 and elastically biases the second cylindrical gear 142b.

When backlash between the first cylindrical gear 142a and the second cylindrical gear 142b is generated, the elastic member 21 biases the second cylindrical gear 142b towards the first cylindrical gear 142a along the axis d-d. Since the first and second cylindrical gears 142a and 142b have corresponding addendum modification coefficients and cone shapes, the second cylindrical gear 142b is capable of moving along the axis d-d to abut the first cylindrical gear 142a to eliminate backlash therebetween. The adjustment of backlash can be performed automatically by the elastic member 21 when backlash is generated by changes in working condition and/or environment. Accordingly, during the operation of the industrial robot 100, the first and second cylindrical gear assemblies 142, 152 can thereby achieve zero backlash meshing conditions to improve upon the transmission stability and precision, and the lifespan of the first and second cylindrical gear assemblies 142, 152.

It should also be understood that the industrial robot described is not limited to a six-axis industrial robot, and can alternatively be industrial robots with fewer axes. For instance, the industrial robot may be with only three arms connected in series.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A backlash adjustment mechanism comprising:
a first cylindrical gear fixed in an axial position;
a second cylindrical gear moveable along an axis thereof and meshed with the first cylindrical gear, and the second cylindrical gear defining a receiving hole extending substantially along the axis of the second cylindrical gear; and
a helical-coil compression spring received in the receiving hole, abutting the second cylindrical gear, and biasing the second cylindrical gear towards the first cylindrical gear, wherein the helical-coil compression spring contacts with inner sidewalls of the receiving hole for limiting a radial movement of the helical-coil compression spring, addendum modification coefficients in the first and second cylindrical gears are linearly changed along their axes, respectively, an end of the first cylindrical gear with higher addendum modification coefficient meshes with an end of the second cylindrical gear with correspondingly lower addendum modification coefficient, and an end of the first cylindrical gear with lower addendum modification coefficient meshes with an end of the second cylindrical gear with correspondingly higher addendum modification coefficient.

2. The backlash adjustment mechanism of claim 1, wherein the first and second cylindrical gears are straight involute gears.

3. An industrial robot comprising:
at least one arm;
a motor and a transmission mechanism coupled to the motor to rotate the at least one arm;
the transmission mechanism comprising:
a first beveled gear comprising a gear shaft;

a second beveled gear meshed with the first beveled gear;
a first cylindrical gear fixed in an axial position;
a second cylindrical gear moveable along an axis thereof and meshed with the first cylindrical gear, and the second cylindrical gear defining a receiving hole extending substantially along the axis of the second cylindrical gear thereof; and
an elastic member sleeved on the gear shaft, wherein the second cylindrical gear is sleeved on the elastic member via the receiving hole, such that the elastic member is positioned in the receiving hole between the second cylindrical gear and the gear shaft, abutting the second cylindrical gear and biasing the second cylindrical gear towards the first cylindrical gear; addendum modification coefficients in the first and second cylindrical gears are linearly changed along their axes, respectively, an end of the first cylindrical gear with higher addendum modification coefficient meshes with an end of the second cylindrical gear with correspondingly lower addendum modification coefficient, and an end of the first cylindrical gear with lower addendum modification coefficient meshes with an end of the second cylindrical gear with correspondingly higher addendum modification coefficient.

4. The industrial robot of claim 3, wherein the first and second cylindrical gears are straight involute gears.

5. The industrial robot of claim 3, wherein the elastic member is a helical-coil compression spring.

6. A six-axis industrial robot comprising:
a fixed base;
a bracket rotatably connected to the fixed base;
a lower arm rotatably connected to the bracket;
an elbow rotatably connected to the lower arm;
a joint connected to the elbow, the joint comprising:
  a fourth arm rotatably connected to the elbow;
  a fifth arm rotatably connected to the fourth arm;
  a sixth arm rotatably connected to the fifth arm;
a first motor and a first transmission mechanism to drive the fifth arm;
a second motor and a second transmission mechanism to drive the sixth arm; wherein at least one of the first and second transmission mechanisms comprises:
  a first beveled gear comprising a gear shaft;
  a second beveled gear meshed with the first beveled gear;
  a first cylindrical gear fixed in an axial position;
  a second cylindrical gear moveable along an axis thereof and meshed with the first cylindrical gear, and the second cylindrical gear defining a receiving hole extending substantially along the axis of the second cylindrical gear; and
  an elastic member sleeved on the gear shaft, wherein the second cylindrical gear is sleeved on the elastic member via the receiving hole, such that the elastic member is positioned in the receiving hole between the second cylindrical gear and the gear shaft, abutting the second cylindrical gear and biasing the second cylindrical gear towards the first cylindrical gear; addendum modification coefficients in the first and second cylindrical gears are linearly changed along their axes, respectively, an end of the first cylindrical gear with higher addendum modification coefficient meshes with an end of the second cylindrical gear with correspondingly lower addendum modification coefficient, and an end of the first cylindrical gear with lower addendum modification coefficient meshes with an end of the second cylindrical gear with correspondingly higher addendum modification coefficient.

7. The six-axis industrial robot of claim 6, wherein the first and second cylindrical gears are straight involute gears.

8. The six-axis industrial robot of claim 6, wherein the elastic member is a helical-coil compression spring.

9. The six-axis industrial robot of claim 6, wherein both the first and second transmission mechanisms comprises the first cylindrical gear fixed in an axial position; the second cylindrical gear moveable along the axis and meshed with the first cylindrical gear; and the elastic member biasing the second cylindrical gear towards the first cylindrical gear.

10. The six-axis industrial robot of claim 9, wherein the first transmission mechanism further comprises a first shaft, the second beveled gear is coupled to the fifth arm, the first motor and the first cylindrical gear are mounted on opposite ends of the first shaft.

11. The six-axis industrial robot of claim 10, wherein the second transmission mechanism further comprises a second shaft, a second beveled gear assembly and a third beveled gear assembly, wherein the second motor and the second cylindrical gear assembly are mounted on opposite ends of the second shaft, the third beveled gear assembly is coupled to the sixth arm, and the second beveled gear assembly is positioned between the second cylindrical gear assembly and the third beveled gear assembly.

12. The six-axis industrial robot of claim 11, wherein the first cylindrical gears of the first and second transmission mechanisms are offset along the axis thereof.

* * * * *